United States Patent [19]

Brennan et al.

[11] 4,410,635

[45] * Oct. 18, 1983

[54] DISCONTINUOUS SILICON CARBIDE FIBER REINFORCED CERAMIC COMPOSITES

[75] Inventors: John J. Brennan, Portland; Karl M. Prewo, Vernon, both of Conn.

[73] Assignee: United Technologies Corporation, Hartford, Conn.

[*] Notice: The portion of the term of this patent subsequent to Mar. 2, 1999 has been disclaimed.

[21] Appl. No.: 345,998

[22] Filed: Feb. 5, 1982

[51] Int. Cl.$^3$ .................... C04B 35/56; C03C 3/22
[52] U.S. Cl. ............................... 501/88; 501/5; 501/7; 501/8; 501/9
[58] Field of Search ............... 501/5, 7, 8, 9, 32, 501/88; 428/697

[56] References Cited

U.S. PATENT DOCUMENTS 3,653,851  4/1972  Gruber ................................. 501/88
3,892,583  7/1975  Winter et al. ....................... 501/92
4,158,687  6/1979  Yajima et al. ...................... 501/95
4,314,852  9/1972  Brennan et al. .................... 501/88
4,324,843  4/1982  Brennan et al. .................... 428/697

Primary Examiner—Mark Bell
Attorney, Agent, or Firm—Harry J. Gwinnell

[57] ABSTRACT

Discontinuous silicon carbide fiber reinforced ceramic composites are disclosed having high strength, fracture toughness, and oxidative stability, even in high temperature oxidative environments. Disclosed composites include silicon carbide fiber reinforced aluminosilicate, lithium aluminosilicate, barium aluminosilicate, magnesium aluminosilicate, and combinations thereof. Flexural strengths in excess of 20,000 psi (138 MPa) at temperatures in excess of 1000° C. are attainable with such composites. The composite is formed by starting with the ceramic matrix material in the glassy state and converting it from the glassy state to the ceramic state after densification of the composite.

6 Claims, No Drawings

DISCONTINUOUS SILICON CARBIDE FIBER REINFORCED CERAMIC COMPOSITES

CROSS REFERENCE TO RELATED APPLICATIONS

U.S. patent application Ser. No. 121,081, filed Feb. 13, 1980, now U.S. Pat. No. 4,324,843 by the same inventors as the present application and commonly assigned is directed to silicon carbide fiber reinforced ceramic composites; U.S. patent application Ser. No. 147,672, filed May 7, 1980, now U.S. Pat. No. 4,314,852 by the same inventors as the present application and commonly assigned is directed to silicon carbide fiber reinforced glass composites; and U.S. patent application Ser. No. 345,996, filed of even date herewith by the same inventors as the present application and commonly assigned is directed to discontinuous silicon carbide fiber reinforced glass composites.

DESCRIPTION

1. Technical Field

The field of art to which this invention pertains is fiber reinforced composites.

2. Background Art

Because of the scarcity and increasing expense of many conventional high temperature structural metals, increased attention has focused on non-metal containing composites as replacements for conventional high temperature metal-containing materials. Use of metal replacement, high strength fiber reinforced resin and even high strength fiber reinforced metal matrix composites has progressed to the point of commercial acceptance in products ranging from sporting goods to advanced jet aircraft components. One of the big problems with these composites, however, has been their maximum use temperature. And while great strides have been made in raising the use temperature, for example by utilizing such composites as graphite fiber reinforced glass and alumina fiber reinforced glass, there is still much room for improvement. For example, while the graphite fiber reinforced glass composite demonstrates high levels of strength, fatigue resistance, and fracture toughness, it is also susceptible to detrimental fiber oxidation at elevated temperatures. And while composites such as alumina fiber reinforced glass are oxidatively stable at high temperatures, the overall strength and toughness levels obtainable with these composites is less than that possible with a graphite reinforced glass system, for example. Accordingly, what is needed in the art is a composite with high strength, high fracture toughness, and oxidation stability at high temperatures.

DISCLOSURE OF INVENTION

The present invention is directed to a solution to the strength, fracture toughness, and oxidation stability problems which exist with composites of the prior art and comprises discontinuous silicon carbide fiber reinforced ceramic composites having high strength, fracture toughness, and oxidation stability, even at elevated temperatures.

The high strength composites according to the present invention comprising the discontinuous silicon carbide fibers laid up in substantially in-plane random orientation in the ceramic matrix have strength and fracture toughness properties greater than that of the ceramic matrix even at elevated temperatures, e.g. in excess of 800° C. and even in excess of 1000° C.

The foregoing, and other features and advantages of the present invention, will become more apparent from the following description.

BEST MODE FOR CARRYING OUT THE INVENTION

A glass, which can be converted to a ceramic, is the ideal matrix material to form the composites of the present invention. During composite densification the matrix is retained in the glassy state, thus avoiding fiber damage and promoting densification under low applied pressure. After densification to the desired fiber plus matrix configuration, the glassy matrix can be converted to the crystalline state, the degree and extent of crystallization being controlled by the matrix composition and heat treatment schedule employed. A wide variety of glasses could be used in this manner, however, a strict limitation on the amount and activity of titanium present in the glass is of controlling importance. Accordingly, if titania nucleating agents are used, they must be inactivated or kept below one percent by weight. This can be accomplished by simply substituting another nucleating agent such as zirconia for the conventional titania or adding an agent, such as lead, to mask the reactivity of the titania toward the silicon carbide fiber. However, in any case it is necessary to either eliminate or mask the effects of the titania on the silicon carbide fiber to attain a composite with the improved properties disclosed. This problem is believed attributable to the reactivity of the titanium to the silicon carbide fiber. And while conventional lithium aluminosilicate is the preferred glass ceramic, other conventional glass ceramics such as aluminosilicate, magnesium aluminosilicate, barium aluminosilicate, and combinations of the above can be used as long as the ceramic matrix material is titanium free. By titanium free is meant that the composition contains less than about 1% by weight titanium or additional components (such as lead) which either mask or inactivate the reactivity of the titanium toward the SiC fibers. It has also been found that the reactivity of the titanium and its adverse composite effects can be lessened by a combination of decreased titania nucleating agent concentration and lower hot pressing temperatures, e.g. a glass ceramic composition with less than 2% by weight titania, hot pressed at temperatures below about 1,100° C. And, as stated above, $ZrO_2$ is a preferred substitute for the titania nucleating agent in amounts up to about 5% by weight, producing no adverse effects on the composite properties. Other nucleating agents may also be successful substitutes for the titania. It should also be noted that in general, the starting glass ceramic material can be obtained in the glassy state in powder form. If, however, the ceramic material is obtained in crystalline form, it will be necessary to melt the material to form it into the glassy state, solidify it and subsequently crush it into powder form, preferably about −325 mesh. An important part of the invention is to select glass ceramic matrix material such as that described above which can be densified (in combination with the SiC fibers) in the glassy state with a viscosity low enough to permit complete densification with subsequent transformation into a substantially complete crystalline state providing a composite with a use temperature in excess of 1,000° C. It is also possible to convert the starting crystalline powder to the glassy state during preheat treatment prior to application of pressure for densification.

Any silicon carbide fiber system with the requisite strength can be used, although a multi-filament silicon carbide yarn with an average filament diameter up to 50 microns is preferred and yarn with average filament diameter of 5 to 50 microns is especially preferred. Nippon Carbon Company of Japan Produces such a yarn with about 250 fibers per tow and an average fiber diameter of about 10 microns. The average strength of the fiber is approximately 2,000 MPa (300,000 psi), and it has a use temperature of up to 1,500° C. The yarn has a density of approximately 2.7 grams per cc and an elastic modulus of approximately 221 GPa ($32 \times 10^6$ psi). The fibers are chopped to paper length (e.g. about 1.0 to about 3.0 cm) by any conventional means and formed into sheets by conventional papermaking techniques.

While the silicon carbide paper used in the samples of the present invention was isotropically laid, i.e. substantially equal number of fibers in-plane in every direction, the fiber laying can be favored in a particular in-plane direction in preparation of an article when it is known that such article will be receiving stress primarily in a single direction. However, to insure the improved properties of composites of the present invention such favored laying should not exceed about 90% of the total fiber laying, the fibers should be laid in-plane, and average fiber length should preferably be about 1 to about 3 cm.

The composites of the present invention are preferably formed by cutting the formed paper to the desired composite shape followed by papermaking binder removal, for example by solvent immersion or touching each ply to a bunsen burner flame to burn off the binder. The plies are next either dipped in a slurry of the glass-ceramic or simply stacked with layers of powdered glass-ceramic sufficient to substantially fill the spaces between the plies placed between each ply. The formed articles are then hot pressed at elevated temperature to form the composites.

The method of forming the composite is also important for obtaining the improved properties described. The ceramic constituents are generally obtained in powder form (preferably about $\times 325$ mesh) in the glassy state (noncrystalline form) and are combined in this powder state with the silicon carbide fibers by hot press consolidation. After densification, the composite is held for a time and at a temperature sufficient to transform the noncrystalline ceramic into the crystalline state by controlled nucleation and growth of the appropriate crystalline phases.

The processing parameters and composition of the material used can vary widely, depending on the ultimate use of the article. While it is not necessary to lay the plies in any particular direction, it has been found that the best strength properties appear to be obtained when each individual ply is laid up in the same direction, i.e. all plies are aligned during lay-up to keep colinear their original orientation with regard to the paper roll axis.

The preferred method for forming the articles of the present invention is by hot pressing the mixture of silicon carbide fibers and noncrystalline ceramic powder as mentioned above. This method gives particular design flexibility in orienting the fibers, and sheets formed by such method are particularly adapted to hot pressing into desired shapes. An exemplary method comprises continuously unwinding a roll of silicon carbide paper from a spool at a moderate rate of speed and passing such fibers through a slip of the powdered ceramic, solvent and plasticizer to impregnate the sheets. The impregnated sheets can then be rewound onto a larger rotating spool. An exemplary slip composition may be composed of 40 gm of powdered glass ceramic and 780 ml of propanol. An alternative composition may comprise 85 gm of the glass ceramic and 200 gm of propanol, 10 gm of polyvinyl alcohol and 5 drops (approximately 1 cc) of a wetting agent such as Tergitol ®. The receiving drum is preferably run at one revolution per minute or linear speed of 5 feet per minute (2.54 cm per sec.). Excess glass ceramic and solid can be removed by pressing a squeegee against the drum as it winds. Preferably the ground ceramic is sized so that 90% of it passes through a $\times 325$ mesh sieve. The thus impregnated tape is then dried either at ambient temperature or with a radiant heat source to remove solvent.

Following impregnation, the sheets are removed from the drum and cut into strips to conform to the dimensions of the article to be fabricated. In a key processing step, the assembled composite is then hot pressed either under vacuum or inert gas such as argon in metal dies coated with colloidal boron nitride or graphite dies sprayed with boron nitride powder at pressures of 6.9–13.8 MPa (1,000–2,000 psi) and temperatures of 1,100° C.–1,500° C. Time of hot pressing will vary depending on composite makeup, but generally will be accomplished between about 10 minutes and 1 hour. Additional glass also in powder form may be inserted between each layer as it is laid. SiC fiber loading in the composite is preferably about 15% to about 50% by volume. The mold can also be vibrated to ensure uniform distribution of the ceramic powder over the laid fiber surfaces. Processing by starting with the matrix material in the glassy state to permit composite densification by hot pressing, followed by converting the ceramic into the crystalline state largely contributes to the superior properties of the resulting composite. If after hot pressing, any significant portion of the ceramic matrix material is found to be in the glassy state, further heat treatment may be necessary to substantially completely crystallize the matrix for optimum high temperature performance. And although it is preferred to have the ceramic matrix material in the fully ceramic state, acceptable composite properties are attainable even if some of the ceramic matrix is retained in the composite in the glassy state, e.g. up to 25% by weight.

Based on the composition of the matrix material, the particular fiber reinforcement, and the process of forming the composite, an article with exceptional high strength, fracture toughness, and oxidation resistance especially at high temperatures is obtained.

As can be seen from both the above processing description and the below cited Example, the composites of the present invention are much easier to construct than the continuous fiber type composites. The particular care required when laying continuous fibers is not necessary here. Furthermore, it is known that composites containing continuously laid fibers can develop microcracks parallel to the fiber lengths when they are compressed which can result in channeling and fluid leakage. Because of the discontinuous orientation of the fibers of the present invention, this is not possible. It is also noteworthy that while continuous length silicon carbide fiber reinforced ceramic composites have tensile strain to failure values of the order of 0.1 to 0.3%, the discontinuous fiber reinforced composites of the present invention are believed to have values in excess of 0.6%.

EXAMPLE

Silicon carbide fibers provided by Nippon Carbon Company as described above were chopped into about 2.0 cm lengths and formed into paper-like sheets (by International Paper Co.) containing about 5 to 10% by weight of a polyester binder which were then cut into individual pieces about 2.75 in. by 0.625 in. (6.99 cm by 1.59 cm). The binder was removed by holding each ply over a bunsen burner flame to burn off the binder. The plies were then dipped into a slurry of lithium aluminosilicate glass-ceramic powder (substantially the same as Corning 9608 but with $ZrO_2$ substituted for the $TiO_2$ nucleating addition of the 9608 for the reasons described above) in propanol. An exemplary slip composition comprised 40 grams of powdered glass-ceramic in 780 milliliters of propanol. Preferably, the glass-ceramic is ground so that 90% of it passes through a −325 mesh sieve. Thus impregnated fiber pieces can be either air dried or dried with a radiant heat source such as a heating blower to remove solvent. Similarly, it is not necessary to cut the discontinuous fiber into the desired shape prior to forming the composite but it can be so formed after impregnation with the glass-ceramic. The resulting impregnated papers were stacked about 50 layers deep in a die assembly for consolidation at elevated temperature. Hot pressing consolidation was performed at 1450° C. at a pressure of about 6.9 MPa ($1 \times 10^3$ psi) for about 15 minutes in inert atmosphere (vacuum and argon). The resultant composites contained about 40% by volume silicon carbide fibers, the remainder consisting of lithium aluminosilicate ceramic. The samples were about 0.07 inch (0.178 cm) thick.

Superior strength, failure strain, in-plane isotropy (for isotropically laid fibers), fluid impermeability fracture toughness, wear resistance, workability, machineability, and ease of fabrication are key properties which distinguish composites of the present invention from those of the prior art. Three-point bend strength tests were performed to demonstrate the superiority of these properties in the composites of the present invention. In the three-point bend tests, the specimen tested was 5.5 cm×0.5 cm×0.2 cm. All specimens were presurface ground with a diamond abrasive wheel to remove excess surface glass-ceramic resulting from fabrication. For the three samples tested, flexural strength values of $23.6 \times 10^3$ psi, $24.1 \times 10^3$ psi, and $24.6 \times 10^3$ psi (162 MPa, 166 MPa, and 169 MPa) and flexural modulus values of $12.7 \times 10^6$ psi, $13.1 \times 10^6$ psi, and $13.0 \times 10^6$ psi (87 GPa, 90 GPa, and 89 GPa) were recorded. Furthermore, it is expected that these values will be maintained at elevated temperatures (e.g. in excess of 800° C. and even in excess of 1,000° C.) in an oxidizing atmosphere. This is a key advantage the composites of the present invention have over similarly constituted graphite fiber reinforced composites which would not maintain such strengths under such conditions. Note for example, column 8, line 60 et seq. of commonly assigned U.S. Pat. No. 4,263,367 which describes the problems encountered with discontinuous graphite fiber reinforced composites in thermal exposure testing in an oxidizing environment.

It is particularly noteworthy that, even after initial fracture, composites of the present invention should retain a substantial fraction of their original untested strength. This resistance to fracture, even in the presence of initiated damage, is distinctly different from the brittle nature of conventional ceramic articles.

The reinforced ceramics of the present invention have particular utility in environments where oxidation resistance, high strength and toughness are required and are especially adaptable to such properties in a high temperature environment (e.g. in excess of 1,000° C. and even, with additional matrix modification, in excess of 1,200° C.) such as in a gas turbine engine or internal combustion engine environment and in high temperature structural ceramic components.

Although this invention has been shown and described with respect to a preferred embodiment, it will be understood by those skilled in this art that various changes in form and detail thereof may be made without departing from the spirit and scope of the claimed invention.

We claim:

1. A silicon carbide fiber reinforced ceramic composite consisting essentially of about 15% to about 50% by volume high strength and high modulus of elasticity discontinuous silicon carbide fibers laid up in substantially in-plane random orientation in a substantially titanium-free glass-ceramic matrix selected from the group consisting of lithium aluminosilicate, magnesium aluminosilicate, barium aluminosilicate, aluminosilicate, and combinations thereof, so as to produce strength and fracture toughness properties greater than that of the matrix at temperatures in excess of 800° C. in an oxidizing environment.

2. The composite of claim 1 having a flexural strength greater than 10,000 psi (68.8 MPa) at temperatures in excess of 800° C. in an oxidizing environment.

3. The composite of claim 1 having a flexural strength greater than 20,000 psi (138 MPa) at temperatures in excess of 800° C. in an oxidizing environment.

4. The composite of claim 1 having a fracture toughness greater than 3 $MPa/m^{3/2}$ at temperatures in excess of 800° C. in an oxidizing environment.

5. The composite of claim 1 having a fracture toughness greater than 5 $MPa/m^{3/2}$ at temperatures in excess of 800° C. in an oxidizing environment.

6. A silicon carbide fiber reinforced ceramic composite consisting essentially of about 15% to about 50% by volume high strength, high modulus of elasticity silicon carbide fibers having an average length of about 1 cm to about 3 cm laid up in substantially in-plane random orientation in a substantially titanium-free glass-ceramic matrix of lithium aluminosilicate, magnesium aluminosilicate, barium aluminosilicate, aluminosilicate, and combinations thereof, producing a composite with flexural strength and fracture touchness properties greater than the ceramic matrix at elevated temperatures.

* * * * *